United States Patent

Bickmore et al.

[11] Patent Number: 5,984,997
[45] Date of Patent: Nov. 16, 1999

[54] COMBUSTION OF EMULSIONS: A METHOD AND PROCESS FOR PRODUCING FINE POWDERS

[75] Inventors: Clint Bickmore; Benjamin Galde; Tapesh Yadav; John Freim, all of Tucson, Ariz.

[73] Assignee: Nanomaterials Research Corporation, Longmont, Colo.

[21] Appl. No.: 09/046,465

[22] Filed: Mar. 23, 1998

Related U.S. Application Data

[60] Provisional application No. 60/057,218, Aug. 29, 1997, and provisional application No. 60/064,050, Nov. 3, 1997.

[51] Int. Cl.$^6$ .................................................. B22F 9/30
[52] U.S. Cl. .............................. 75/343; 75/351; 75/353; 75/362; 75/363
[58] Field of Search ............................. 75/343, 351, 353, 75/362, 363

[56] References Cited

U.S. PATENT DOCUMENTS

| | | | |
|---|---|---|---|
| 3,013,875 | 12/1961 | Triffleman . | |
| 3,373,012 | 3/1968 | Hardy et al. . | |
| 3,488,291 | 1/1970 | Hardy et al. . | |
| 3,527,595 | 9/1970 | Adler . | |
| 5,064,464 | 11/1991 | Sawada et al. | 75/347 |
| 5,194,128 | 3/1993 | Beaty et al. | 204/164 |
| 5,219,804 | 6/1993 | Weimer et al. | 501/96 |
| 5,286,337 | 2/1994 | Tsou | 1156/643 |
| 5,407,458 | 4/1995 | König et al. | 75/255 |
| 5,447,708 | 9/1995 | Helble et al. . | |
| 5,486,675 | 1/1996 | Tayler et al. . | |
| 5,599,511 | 2/1997 | Helble et al. . | |
| 5,759,230 | 6/1998 | Chow et al. | 75/362 |
| 5,852,768 | 12/1998 | Jacobsen et al. | 419/63 |

FOREIGN PATENT DOCUMENTS

96/29280  9/1996  WIPO .

OTHER PUBLICATIONS

Bickmore, et al., "Ultrafine Spinel Powders by Flame Spray Pyrolysis of a Magnesium Aluminum Double Alkoxide," *J. Am. Ceram. Soc.*, 79(5):1419–1423 (1996).

*Primary Examiner*—Ngoclan Mai
*Attorney, Agent, or Firm*—Choate, Hall & Stewart; Holland & Hart LLP; Stuart T. Langley

[57] ABSTRACT

A process for producing nanoscale powders, and the powders so produced. The process comprises mixing an emulsion comprising all of the elements of the desired powder composition and a combustible fuel, and then combusting that emulsion to produce a powder. Powders with a median particle size of less than 50 nm have been made by this process. The process is suitable for the production of many types of powders, including particles and nanowhiskers of simple, doped, and polymetallic powders.

13 Claims, 6 Drawing Sheets

COMBUSTION OF EMULSIONS: A METHOD AND PROCESS FOR PRODUCING FINE POWDERS

This application claims benefit of copending U.S. provisional application Ser. No. 60/057,218, "Combustion of Emulsions—A Method & Process for Producing Fine Powders," by Bickmore, et al., filed Aug. 29, 1997, and Ser No. 60/064,050, "Polycomponent Nanostructured Powders," by Pirzada, et al., filed Nov. 3, 1997, both of which are incorporated herein by reference in their entirety.

FIELD OF THE INVENTION

This invention relates to the production of powders, especially powders of nanometer scale, by combustion of emulsions.

BACKGROUND OF THE INVENTION

Fine powders with mean size less than 1 micron in general, and nanoscale powders with mean size less than 100 nm in particular, are a novel family of materials. A distinguishing feature of these materials is that a mean domain size is so small that size confinement effects become a significant determinant of the materials' performance. Such confinement effects can, therefore, lead to a wide range of commercially important properties. For example:

- enhancement in mechanical properties, such as strengths and hardness;
- unique optical properties, when a domain size is less than the wavelength of visible light;
- unique electrical and electrochemical properties, when the interfacial atoms are a significant percentage of all atoms, and a domain dimension is less than the mean free path of electrons or holes, skin depth, Debye length, electron cloud thickness, or other physical parameters;
- unique electronic properties such as coulomb blockade;
- unique thermal properties, when a domain dimension is less than phonon length, and the interfacial processes are significant contributor to the overall properties;
- unique chemical properties, such as enhanced solubilities leading to non-equilibrium compositions, metastable states, and isotropic crystals;
- unique magnetic properties when a material's domain dimension is less than the magnetic domain size; and
- unique manufacturing properties, such as low temperature faster sintering of ceramics, metals, composites and alloys, and superplastic forming.

Fine powders in general, and nanoscale powders in particular, therefore, represent an extraordinary opportunity for design, development and commercialization of a wide range of applications in structural, electrochemical, electrical, optical, electronics, magnetic, chemical products, and combinations thereof. Furthermore, since they represent a whole new family of material precursors where conventional coarse-grain physiochemical mechanisms are not applicable, these materials offer unique combinations of properties that can enable novel and multifunctional components of unmatched performance.

Previous patents teach the importance of fine powders and they also teach the art of producing a wide range of these powders (See, for example, U.S. Pat. Nos. 5,486,675; 5,447,708; 5,407,458; 5,219,804; 5,194,128; and 5,064,464, all of which are incorporated herein by reference). The teachings in these patents attest to the importance of these powders, yet they do not offer a method or process for high volume, low-cost production of fine powders in general and nanoscale powders of complex compositions in particular. There are several characteristics that need to be achieved in a practical commercial process:

- The precursor raw materials for the process and method should be low-cost, safe, readily available, and environmentally benign;
- The compositions should be easily tailored to specific needs of the ultimate application;
- It should be possible to synthesize and control the composition of final powder characteristics; and
- It should be possible to collect the synthesized material without damage or loss of material.

No currently available production method has all these characteristics.

SUMMARY OF THE INVENTION

In one aspect, the invention comprises a method of continuously producing fine powders of complex inorganic compositions, including, but not limited to, carbides, nitrides, oxides, chalcogenides, halides, phosphides, borides, and combinations thereof by combustion of emulsions. By varying the characteristics of the initial emulsion, the size, shape, surface area, morphology, surface characteristics, surface composition, distribution, and degree of agglomeration of the final powder may be controlled. And, in conjunction with varying combustion conditions, the product chemistry may be varied to obtain non-stoichiometric, reduced oxide, or mixed anion materials. Examples of this embodiment include the use of non-stoichiometric flames or reducing gases such as hydrogen, forming gas, or ammonia. It is an advantage of these aspects of the invention that the method can use low cost, safe, readily available and environmentally benign precursors to produce fine powders. In a preferred embodiment, the method ensures high yield and high selectivity, including harvesting 95% or more of the fine powder produced. In another embodiment, the method prevents the damage of the fine powders during and after their synthesis.

In another aspect, the invention includes multimetallic powders having a median particle size of less than 5 $\mu$m and a standard deviation of particle size of less than 100 nm. In preferred embodiments, the median particle size is less than 100 nm and the standard deviation of particle size is less than 25 nm, and in further preferred embodiments, the median particle size is less than 30 nm and the standard deviation of particle size is less than 10 nm. The multimetallic powders include at least two elements selected from the s group, p group, d group, and f group of the periodic table (e.g., aluminum, antimony, barium, bismuth, boron, bromine, cadmium, calcium, carbon, cerium, cesium, chlorine, chromium, cobalt, copper, dysprosium, erbium, europium, gadolinium, gallium, germanium, gold, hafnium, holmium, indium, iodine, iridium, iron, lanthanum, lead, lithium, lutetium, magnesium, manganese, molybdenum, neodymium, nickel, niobium, nitrogen, osmium, oxygen, palladium, phosphorus, platinum, praseodymium, potassium, rhenium, rhodium, rubidium, samarium, scandium, silicon, silver, sodium, strontium, sulfur, tantalum, terbium, thulium, tin, titanium, tungsten, vanadium, ytterbium, yttrium, zinc, and zirconium), and may include three or more such elements. The powders may be unagglomerated and/or unaggregated. The multimetallic powders may also comprise nanowhiskers and/or nanorods, with aspect ratios in a range of 1–25.

As it is used herein, the term "nanopowder" describes a powder whose mean diameter is so small that its physical properties are substantially affected by size related confinement effects. Nanopowders usually have a mean diameter less than or equal to 250 nm, and preferably have a mean diameter less than or equal to 100 nm. More preferably, nanopowders may have a mean diameter less than 50 nm.

As it is used herein, the term "agglomerated" describes a powder in which at least some individual particles of the powder adhere to neighboring particles, primarily by electrostatic forces, and "aggregated" describes a powder in which at least some individual particles are chemically bonded to neighboring particles.

As it is used herein, the term "aspect ratio" refers to the ratio of the maximum to the minimum dimension of a particle.

As it is used herein, the term "whisker" refers to any elongated particle (e.g., a particle having an aspect ratio greater than one, and preferably at least two). Whiskers may be round or faceted, and may have varying diameters. "Rods" are substantially cylindrical whiskers. "Nanowhiskers" and "nanorods" refer to rods and whiskers whose smallest dimension is so small that their physical properties are substantially affected by size related confinement effects. Nanowhiskers and nanorods usually have a minimum dimension less than or equal to 250 nm, and preferably have a minimum dimension less than or equal to 100 nm. More preferably, these particles may have a minimum dimension less than 50 nm.

BRIEF DESCRIPTION OF THE DRAWING

The invention is described with reference to the several figures of the drawing, in which.

DETAILED DESCRIPTION

Figure 1:
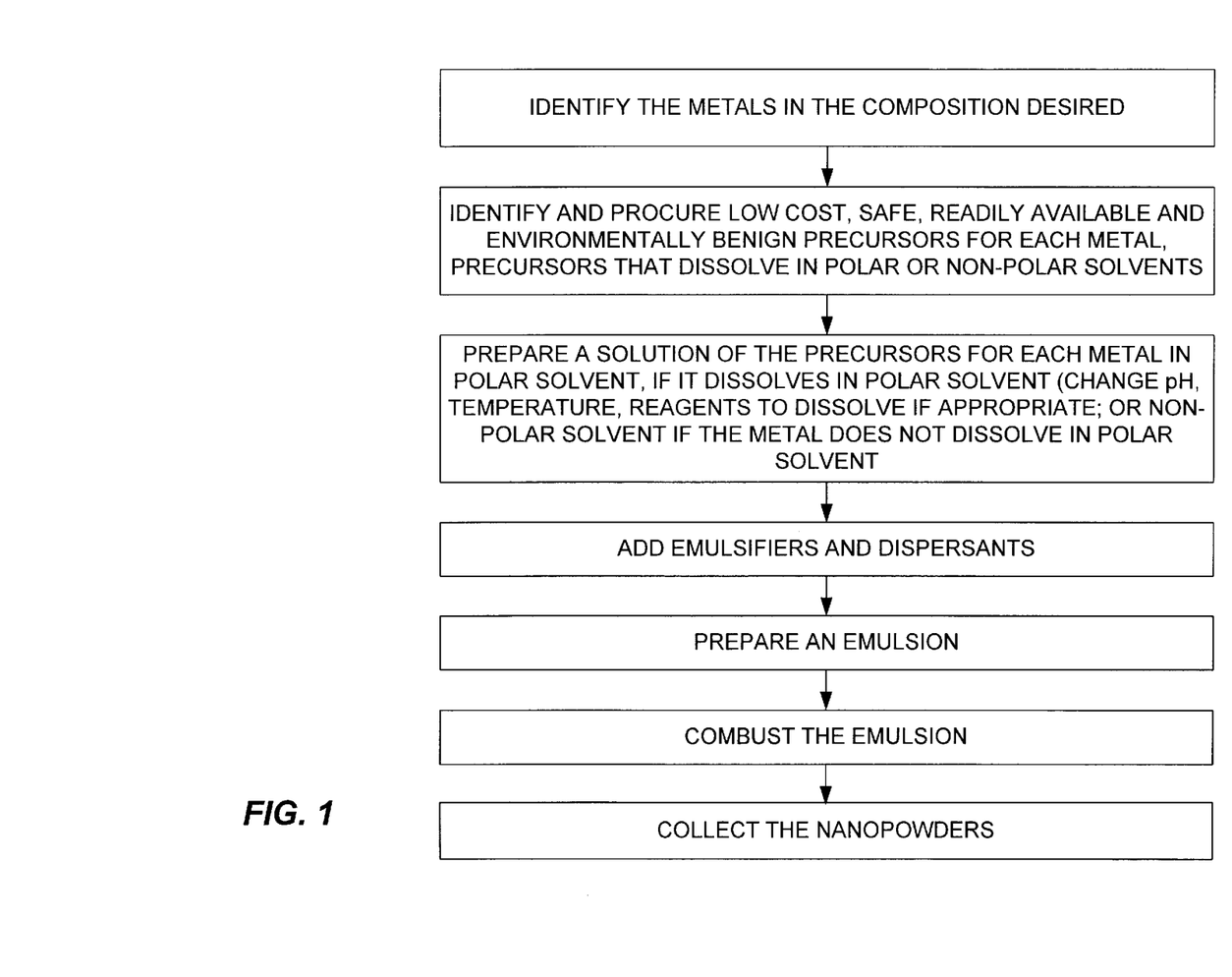
FIG. 1 is a flow chart illustrating the steps of a method of producing nanopowders according to the invention.

FIG. 1 presents the approach of this invention. The process begins by preparing solutions or suspensions of metals desired in the complex composition. For example, if a doped complex of composition $d_1$-$M_1M_2X$ is desired, then according to the invention, one should prepare solutions or suspensions of dopant $d_1$, metals $M_1$ and $M_2$, and anion X, where $M_1$ and $M_2$ are selected from the s, p, f, and d groups of the periodic table, and X is selected from the p group of the periodic table. Solutions or suspensions may be prepared, for example, by mixing solutions containing each of the constituent elements of the desired powder. Elements $d_1$, $M_1$, and $M_2$ are selected from the group consisting of the s group, p group, d group, or f group of the periodic table, and X is selected from the group consisting of carbon, nitrogen, oxygen, boron, phosphorus, sulfur, chalcogens, and halogens.

It will be understood by those skilled in the art that powders comprising larger numbers of dopants, metals, and anions can also be produced by the same methods. In particular, polymetallic materials comprising at least three metals and at least one anion can be produced. These materials are useful in the manufacture of capacitors, inductors, varistors, resistors, piezo-devices, thermistors, thermoelectric devices, filters, connectors, magnets, ion-conducting devices, sensors, fuel cells, catalysts, optics, photonic devices, lasers, tooling bits, armor, superconductors, inks, and pigments, for example. Prior art polymetallic powders are limited to sizes in excess of 300 nm, and mostly to sizes in excess of 1 µm. By the methods of the invention, solid or porous polymetallic nanopowders can be made, with sizes less than 250 nm, and preferably less than 100 nm. Furthermore, by the methods of the invention, nano-whiskers and nano-rods can be produced with aspect ratios of 25 or less, having a minimum dimension of less than 250 nm, and preferably less than 100 nm. At this scale, size confinement effects can come into play for many polymetallic powders.

The solutions or suspensions of the invention can be aqueous based or organic based. While this invention does not limit itself to a specific cation or anion, it is desirable to use anions and cations that are either part of the final product or completely volatile. The final products are not limited to ionic materials, and include covalent and mixed ionic-covalent materials such as carbides, borides, nitrides, sulfides, oxycarbides, oxynitrides, oxyborides and oxysulfides. Illustrative formulations, but not exhaustive, then are nitrate, nitrites, nitriles, nitrides, carbonates, bicarbonates, hydroxides, cyanos, organometallics, carboxylates, amines, and amides. Once the individual solutions or suspensions are available, an emulsion is prepared from the solution or suspensions.

A distinctive feature of the invention is the use of emulsion as the vehicle for carrying fuels and metals. Once an emulsion formulation has been established, dopants and other metals can be readily added to the said emulsion to prepare and vary complex compositions. The approach here is that the emulsion formulation(s) and dopants can be stored separately and then mixed at will to achieve an application-specific complex composition. To vary the final composition, the proportion of formulation(s) and dopants can be changed. To illustrate, if two separate emulsion formulations are available for preparing $M_1O$ and $M_2O$, then the composition $(M_1)_{0.1}(M_2)_{0.9}O$ can be prepared by mixing the two formulations in 10:90 ratio respectively; on the other hand, if the composition $(M_2)_{0.1}(M_1)_{0.9}O$ is desired, it can be prepared by mixing the two formulations in 90:10 ratio respectively. One or more dopants can also be added as desired. For more complex formulations, one can mix different emulsions and dopants. An advantage of the invention is that a wide range of complex nanoscale powder compositions can be prepared from a small set of ingredients, that is, emulsion formulation(s) and dopant solutions. Another advantage is that the cost of producing specific compositions can be lowered from economies possible in preparing common ingredients in bulk. Yet another advantage is that emulsions can be prepared from very low-cost, readily available precursors. As will be apparent to those skilled in the art, it is important to ensure that the emulsions being mixed are compatible. It will also be apparent that many emulsions can be prepared for the same metal—a fact that adds versatility to this invention.

The emulsion may be either polar-in-non-polar (water-in-oil) or non-polar-in-polar (oil-in-water) or of any other at least temporarily stable type, including polar-in-polar and non-polar-in-non-polar. Some representative stable emulsions are described, for example, in Kirk-Othmer, "Emulsions," *Encyclopedia of Chemical Technology*, Vol 9, Wiley-Interscience, New York, 1994. While stable emulsions are preferred, metastable emulsions and temporarily stable emulsions are also within the scope of the invention. To practice the invention, metastable emulsions and temporarily stable emulsions must be stable for a time at least equal to or greater than the time needed to transport and combust the emulsion.

According to the invention, at least one component of the emulsion acts as a fuel. The fuel component can be part of one of the solution phases or can be separately added to achieve combustibility. Emulsifying agents and dispersants may also be added to homogenize or stabilize the emulsion, to enhance combustion, or to achieve a combination of these characteristics.

The emulsions are pumped directly and atomized, or, alternatively, carried in a gas or a mix of gases that do not possess or do not contribute an element that is not desired in the final composition. Preferred carrier stream gases are nitrogen, air, oxygen, argon, helium, neon, and xenon. It is also within the scope of the invention to include in the carrier stream a reactant such as ammonia gas.

The emulsion is then combusted using designs such as, but not limited to, those taught by Khavkin (*Combustion System Design*, PennWell Books, Tulsa Okla., 1996) and Fischer (*Combustion Engineer's Handbook*, G. Newnes Publisher, London, 1961), which are incorporated herein by reference. The combustion can be accomplished using a laminar or turbulent flame, a premixed or diffusion flame, a co-axial or impinging flame, a low-pressure or high-pressure flame, a sub-sonic or sonic or super-sonic flame, a pulsating or continuous flame, an externally applied electromagnetic field free or externally applied electromagnetic field influenced flame, a reducing or oxidizing flame, a lean or rich flame, a secondary gas doped or undoped flame, a secondary liquid doped or undoped flame, a secondary particulate doped or undoped flame, an adiabatic or non-adiabatic flame, a one-dimensional or two-dimensional or three-dimensional flame, an obstruction-free or obstructed flame, a closed or open flame, an externally heated or externally cooled flame, a pre-cooled or pre-heated flame, a one burner or multiple burner flame, or a combination of one or more of the above. Usually, combustion temperatures will be in excess of 600° C., a temperature at which diffusion kinetics will be sufficiently fast that a compositionally uniform powder will be produced.

The emulsion can also be a feed to other processes of producing nanoscale powders. Examples include the powder-formation processes described in copending and commonly assigned U.S. patent application Ser. No. 08/707, 341, "Boundary Layer Joule—Thompson Nozzle for Thermal Quenching of High Temperature Vapors," and Ser. No. 08/706,819, "Integrated Thermal Process and Apparatus for the Continuous Synthesis of Nanoscale Powders," both of which are incorporated herein by reference.

The combustion products are quenched if appropriate and then collected. In practicing the invention, it is preferred that the product gases be quenched to freeze the growth and further reaction of the product. This can be accomplished in numerous ways. Some illustrations include, but are not limited to, expansion of gases, addition of coolant gases or liquids, addition of materials which absorb heat (for example, heat absorption associated with phase transformation of liquid nitrogen to gaseous nitrogen), radiative cooling, conductive cooling, convective cooling, application of cooled surface, or impinging into liquid. The preferred method in this invention is radiative cooling. It is suggested that the gas stream containing the fine powder be protected from contamination, and that steps be taken to prevent the deposition of the powders to the walls. This can be achieved by using methods such as active cooling, or by using confinement gas stream, e.g., a blanket of inert gases along the walls of the reactor. The use of confinement blanket gas stream all along the periphery of the product stream also minimizes or prevents the deposition of fine powders to the walls of the reactor from thermophoresis.

The fine powder-containing stream is then separated into gas and solid stream. The separation can be accomplished using numerous methods. Some illustrative methods are the use of bag houses containing polymeric or inorganic filters, electrostatic filtration, surface deposition on cold surfaces followed by scraping with a blade, centrifugal separation, in-situ deposition in porous media, and absorption or adsorption in liquids or solids. A preferred method is the use of bag houses.

If one is manufacturing a metal oxide or mixed metal oxide, it is desirable that electronegative atoms other than oxygen be avoided when selecting a metal salt, an organometallic, a solvent, a combustible carrier fluid and/or a surfactant. Nitrogen is acceptable as a carrier fluid, but not preferred. Electronegative atoms to be avoided during oxidation are fluorine, chlorine, bromine, iodine, sulfur, phosphorus, selenium, tellurium, boron and silicon. If one wishes to manufacture a material involving an electronegative ion other than oxygen, then other electronegative atoms not desired should be avoided. If one wishes to manufacture a material that does not involve oxygen, then appropriate electronegative atoms or secondary combustion gases must be added to the combustion process.

EXAMPLES

Example 1

Tungsten Oxide

This example illustrates the use of the invention to produce a simple nanopowder composition using a polar-in-non-polar emulsion.

Ammonium meta-tungstate (55 g) was placed in a 500 ml beaker with ethylene glycol (100 mL). This mixture was stirred to form a clear solution. While stirring, 500 mL of Igepal® 520-CO and 500 mL of naphtha were added to the solution, yielding a clear emulsion tungstate/glycol solution (polar phase) in naptha (non-polar phase). The Igepal® 520-CO served as an emulsifying agent. ®Igepal is a registered trademark of Rhone-Poulenc Surfactants and Specialties, L.P.

Combustion of the emulsion produced an incandescent flame. A yellow powder, characteristic of tungsten oxide, was visible depositing within the combustion chamber. TEM and SEM observations indicated that the powder consisted of particles with both equiaxed (<100 nm) and acicular morphologies (e.g., 10×100 nm), and that the powder comprised solely sub-micron particles. These particle sizes are corroborated by X-ray diffraction data, suggesting crystallite sizes ranging from 14 to 33 nm for the primary peaks of the hexagonal $WO_3$ powder, a mean minimum domain size of about 25 nm and a standard deviation of about 7 nm. The specific surface area as measured by Brunauer, Emmett, and Teller analysis (described in more detail in Brunauer, et al., *J. Am. Chem. Soc.,* 60:309, 1938, and hereinafter referred to as BET) was 31.5 m$^2$/g, giving a 30 nm equivalent spherical diameter. The experiment also produced WO$_3$ nanowhiskers and nanorods with aspect ratios ranging from 5 to 15.

Example 2

Gallium Oxide

This example illustrates the use of the invention to produce another nanopowder of simple composition, gallium oxide.

A gallium-containing solution was prepared by adding coarse gallium oxide (70 g) to a 2 L Schlenk flask with 6 equivalents of nitric acid (2×excess HNO$_3$) and diluted by 50% with deionized water. The mixture was refluxed overnight, and was clear by morning. The solution was then concentrated by distilling the contents to a volume of 500 mL. The solution was placed in a 4 L beaker with ethylene glycol (500 mL). This mixture was stirred to form a clear solution. While stirring, 1500 mL of Igepal® 520-CO and 1000 mL of naphtha were added to the solution, yielding a clear emulsion. The Igepal® 520-CO served as an emulsifying agent.

Figure 2:
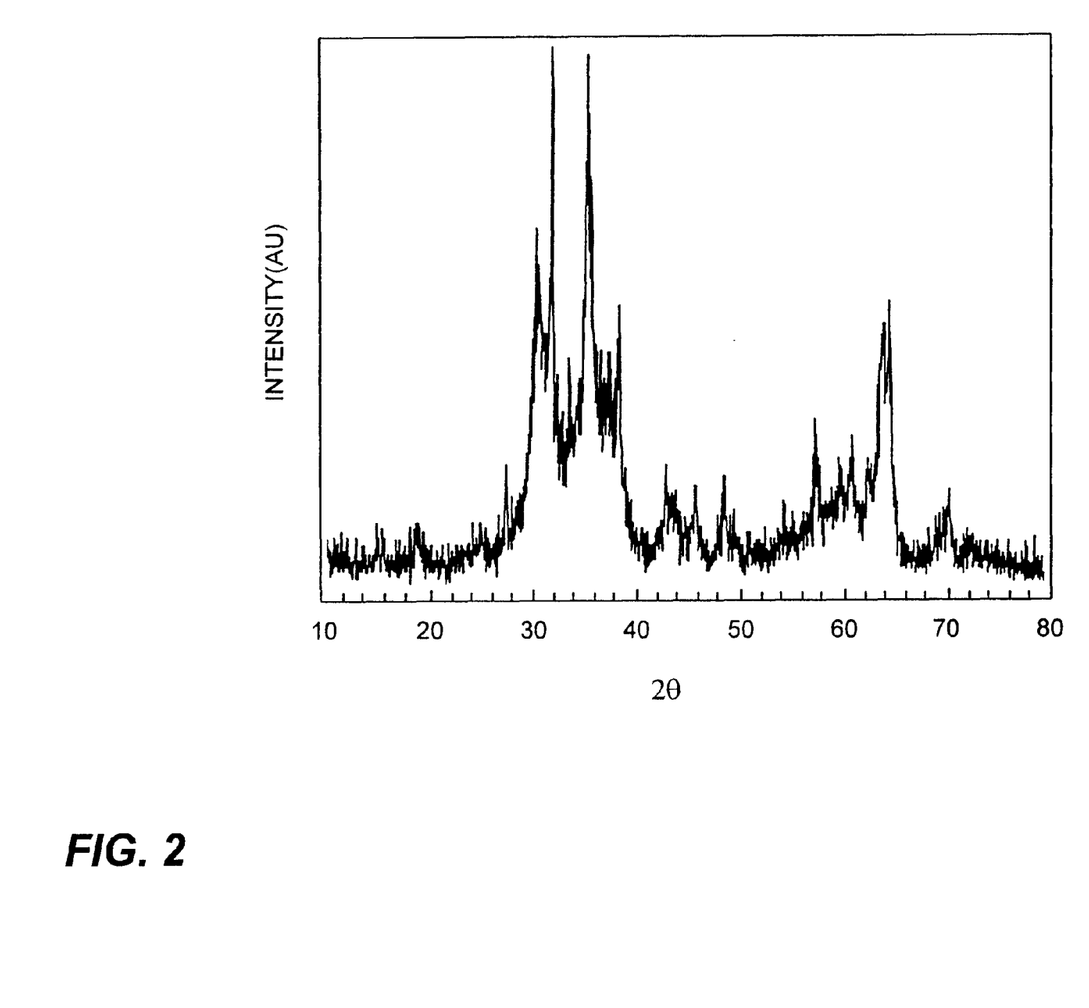
FIG. 2 shows the X-ray diffraction (XRD) spectrum of the gallium oxide nanopowder of Example 2.

Flaming of the emulsion produced an incandescent flame. A white powder was collected and characterized. TEM and SEM observation showed that the powder comprised solely submicron particles with both equiaxed (<100 nm) and acicular (e.g., 10×200 nm) morphologies. XRD data are presented in FIG. 2, indicating that crystallite sizes ranged from 14 to 33 nm for the primary peaks of the monoclinic Ga$_2$O$_3$ powder, a mean crystallite size of about 22 nm and a standard deviation of about 6 nm. BET analysis yielded a specific surface area of 43 m$^2$/g, giving a 23±5 nm equivalent spherical diameter.

Example 3

Tungsten Doped Tin Oxide

This example illustrates the use of the invention to produce a complex nanopowder composition using a polar-in-non-polar emulsion.

Ammonium meta-tungstate (7.95 g) was placed in a 500 ml beaker with ethylene glycol (10 mL). This mixture was stirred to form a clear solution. While stirring, 200 mL of Igepal® 520-CO and 200 mL of naphtha were added to the solution, yielding a clear emulsion tungstate/glycol solution (polar phase) in naptha (non-polar phase). The Igepal® 520-CO served as an emulsifying agent. Tetrabutyl tin (98.37 g) was added to the solution and naphtha was added to make a 700 mL volume.

Figure 3:
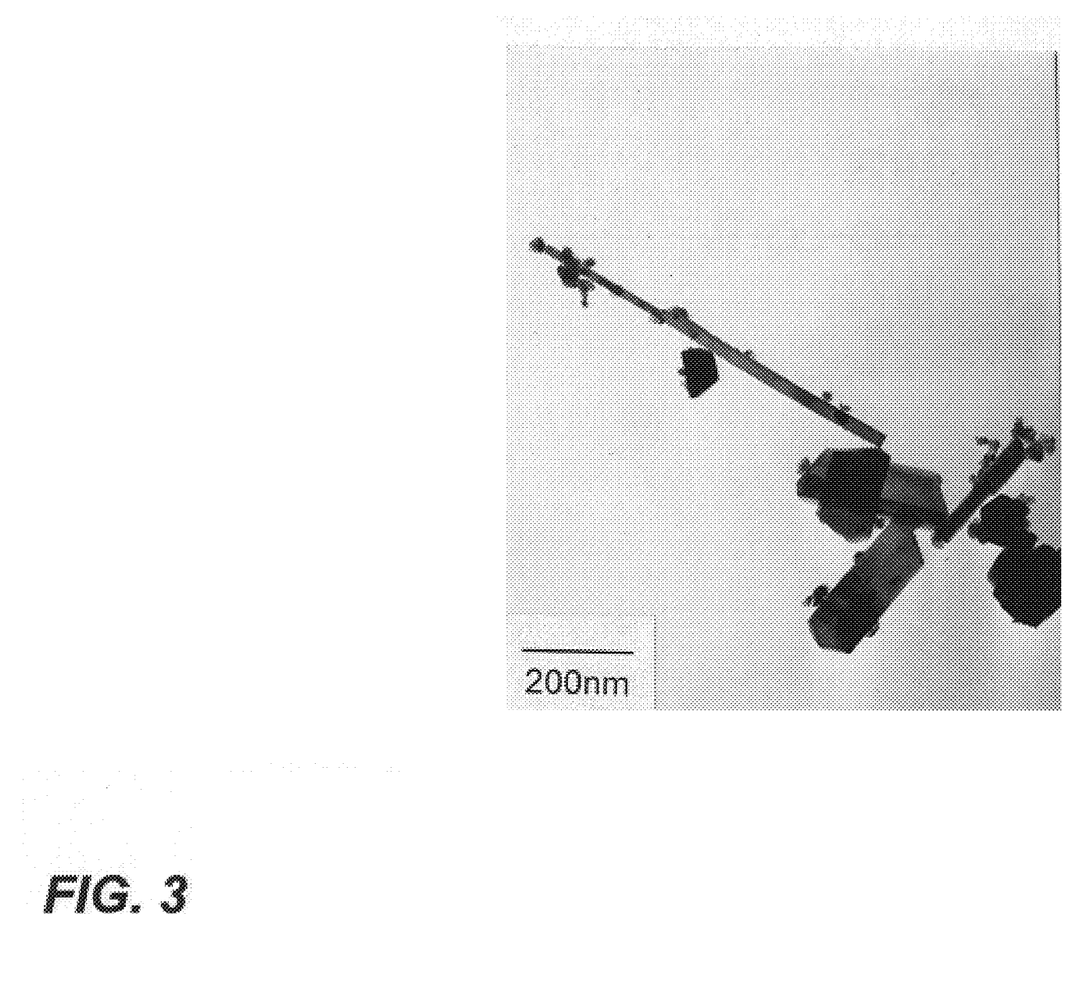
FIG. 3 is a TEM micrograph of the tungsten-doped tin oxide nanopowder of Example 3.

Flaming of the emulsion produced an incandescent flame. A steel-blue powder was collected and characterized. The powder consists of faceted and equiaxed particles ranging from 10 to 75 nm, as seen in the TEM micrograph of FIG. 3 and in SEM micrographs, which showed solely submicron powder. It will be seen from FIG. 3 that both nanowhiskers and equiaxed particles are present. The aspect ratios of the nanowhiskers were in the range of 3–20. Crystallite sizes as measured by X-ray diffraction range from 20 to 30 nm for the primary peaks of the SnO$_2$ powder, and there are no apparent secondary phases attributable to tungsten. The mean minimum domain size as calculated from the XRD data was about 27 nm and the standard deviation was estimated to be about 10 nm. The presence of tungsten was confirmed by X-Ray Electron Diffraction Spectroscopy (XEDS) both in the SEM and the TEM. The BET specific surface area was 35 m$^2$/g, giving an equivalent spherical diameter of about 20–30 nm.

Example 4

Indium Tin Oxide

This example demonstrates the use of the invention to produce a complex nanopowder composition using a non-polar-in-polar emulsion.

Figure 4A:
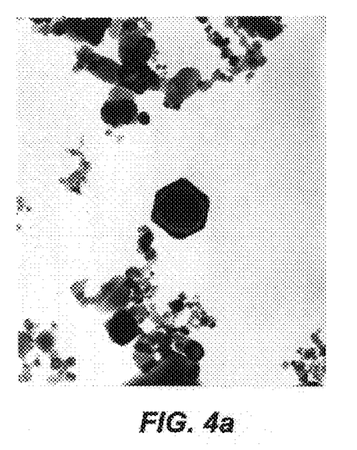
FIG. 4 is a SEM micrograph of the indium tin oxide nanopowder of Example 4.
Figure 4B:
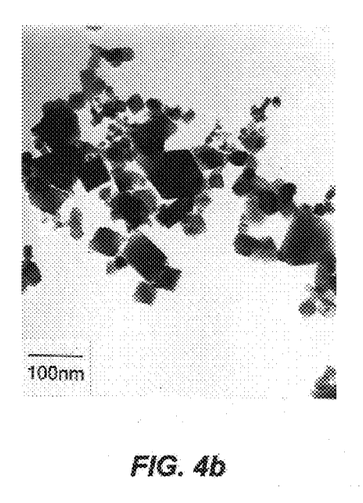

50 g of indium shot was placed in 300 ml of glacial acetic acid and 10 ml of nitric acid. The combination, in a 1000 ml Erlenmeyer flask, was heated to reflux while stirring for 24 hours. At this point, 50 ml of HNO$_3$ was added, and the mixture was heated and stirred overnight. The solution so produced was clear, with all of the indium metal dissolved into the solution, and had a total final volume of 318 ml. An equal volume (318 mL) of 1-octanol was added to the solution along with 600 mL ethyl alcohol in a 1000 mL HDPE bottle, and the resulting mixture was vigorously shaken. 11.25 ml of tetrabutyltin was then stirred into the solution to produce a clear indium/tin emulsion. When the resulting emulsion was burned in air, it produced a brilliant violet flame. A yellow powder residue was collected from the flamed emulsion; scanning electron microscope photographs of this powder are shown in FIG. 4.

Figure 5:
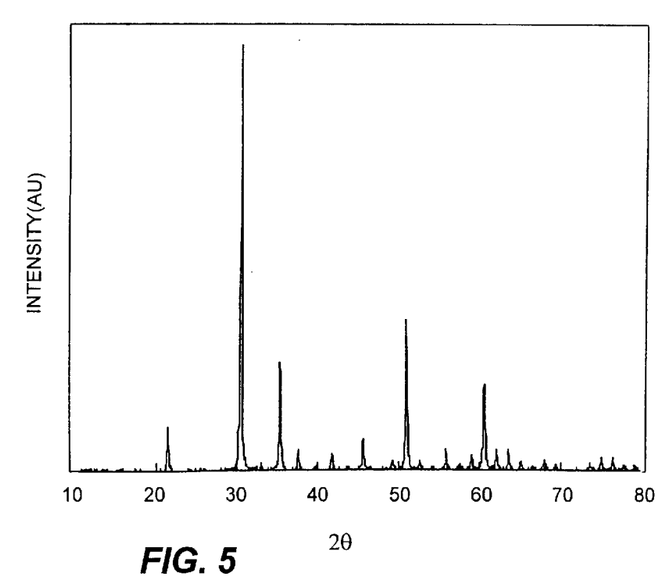
FIG. 5 shows the XRD spectrum of the indium tin oxide nanopowder of Example 4.

X-ray diffraction of the collected powder showed that it contained In$_2$O$_3$ and SnO$_2$ phases. The X-ray diffraction spectrum for the powder is given in FIG. 5. Line broadening analysis of this spectrum indicated that the powder comprised 30.9–38.3 nm In$_2$O$_3$ particles, and 39.3–42.6 SnO$_2$ particles. The mean grain size of the powder was about 37 nm and the standard deviation was about 6 nm.

Example 5

Copper Doped Zinc Tin Oxide

This example illustrates the use of the invention to produce a doped complex nanopowder composition using a non-polar-in-non-polar emulsion.

Copper octoate (23.96 g, 2.88 g CuO$_2$ yield) and zinc octoate (94.82 g, 25.96 g ZnO yield) were placed in a 500 ml beaker with naphtha (200 mL). This mixture was stirred to form a clear solution. While stirring, 200 mL of Igepal® 520-CO was added to the solution. Then tetrabutyl tin (55.37 g, 24.04 g SnO$_2$ yield) was added yielding a clear, stable solution in naphtha. The solution was completed by adding naphtha to make a 1 L volume.

Flaming of the emulsion produced a greenish incandescent flame. An off-white powder was collected and characterized. The powder consisted of faceted and equiaxed submicron particles, typically of 25 to 150 nm. The x-ray crystallite sizes range from 28 to 38 nm for the primary peaks of the spinel structure (Zn$_2$SnO$_4$). The mean particle size was about 34 nm and the standard deviation was about 7 nm. In addition to the spinel phase, there is a secondary minor phase attributable to copper oxide. The presence of copper was confirmed by XEDS both in the SEM and the TEM. The BET specific surface area was 21 m$^2$/g, corresponding to a spherical particle size in the range of 40–50 nm.

Example 6

Copper Doped Nickel Zinc Ferrite

This example illustrates the use of the invention to produce a copper doped nickel-zinc ferrite nanopowder using a polar-in-non-polar emulsion.

Figure 6:
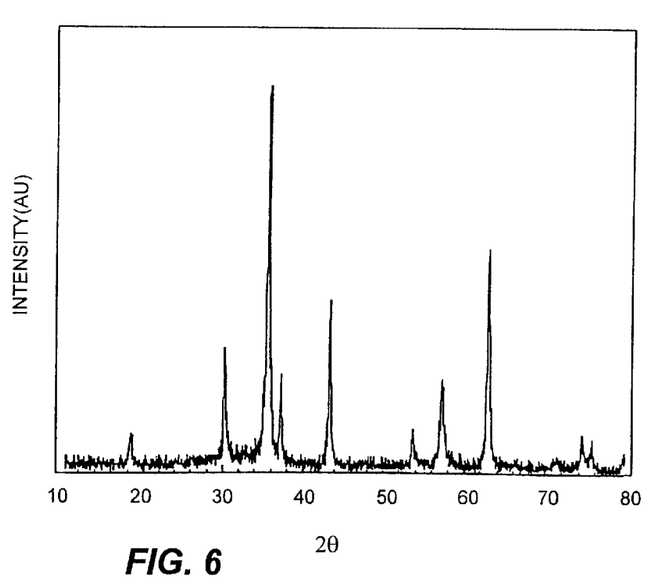
FIG. 6 shows the XRD spectrum of the copper-doped nickel zinc ferrite nanopowder of Example 6.

Commercially purchase metal-carboxylate emulsions (OMG Americas, Westlake, Ohio) were combined to form a clear emulsified solution that would yield the appropriate metal ratios to synthesize 300 g of the oxide. Flaming of the emulsion produced a brilliant incandescent flame. A chocolate-brown powder was collected and characterized. XRD data, shown as FIG. 6, yielded crystallite sizes in the range of 20–40 nm, and indicated that the powder was a phase-pure spinel ferrite. The presence of all constituent elements was confirmed by XEDS in the SEM. The mean particle size of the powder was about 29 nm and the standard deviation was about 8 nm.

Example 7

Polymetallic YBCO-123 Superconductor

This example illustrates the use of the invention to produce a nanopowder of a high-temperature superconductor.

Figure 7:
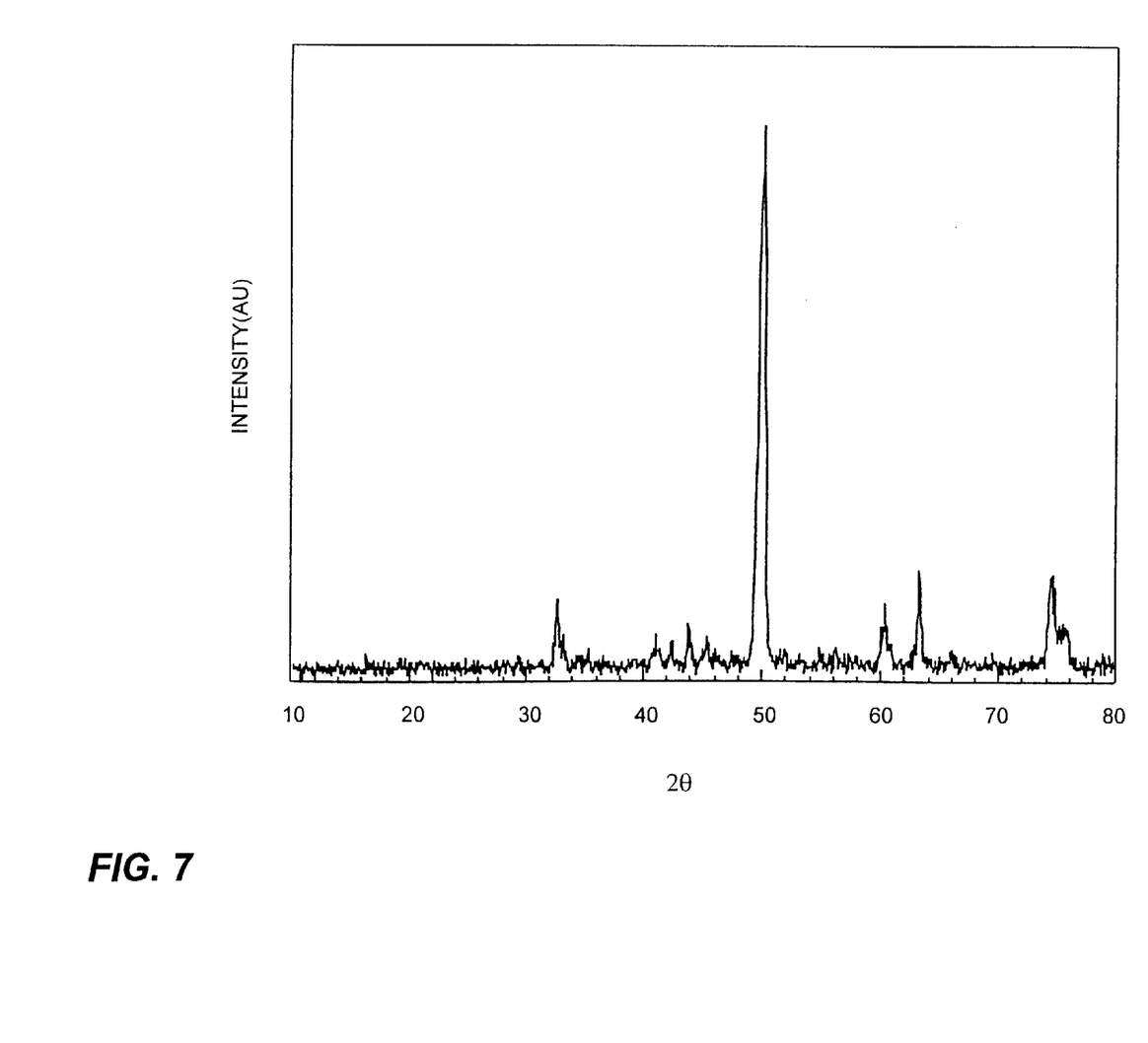
FIG. 7 shows the XRD spectrum of the perovskite nanopowder of Example 7.

0.015 molar yttrim acetate solution was mixed with 0.03 molar solution of barium hydroxide. The resultant solution was mixed with 0.046 molar solution of emulsified copper hydroxide cemall solution. The complex solution was then combusted in a continuous and turbulent premixed flame with oxygen as the oxidant. XRD data, presented as FIG. 7, showed $YBa_2Cu_3O_{7-x}$ perovskite phase, which is useful for superconducting device applications. The XRD analysis showed peak shapes indicative of nanoscale material having crystallite sizes of 18–24 nm. The mean crystallite size was estimated to be about 22 nm and the standard deviation observed was 4 nm. BET analysis of $YBa_2Cu_3O_{7-x}$ powders yielded a specific surface area of 49 $m^2/g$, corresponding to an equivalent spherical diameter of 19 nm (using a value of 6.383 $g/cm^3$ for the density of $YBa_2Cu_3O_{7-x}$). Thus, the XRD and BET data were in good agreement with respect to the particle size of the nanopowder.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A process for producing fine powders of a selected composition, comprising forming a liquid emulsion comprising precursor elements of the selected composition and a combustible fuel;

combusting the emulsion to cause the precursor elements to combine to form a powder of the selected composition; and collecting the powder formed.

2. The process of claim 1, wherein the precursor elements comprise at least two metals selected from the group consisting of the s group, p group, d group, and f group of the periodic table, and at least one non-metal selected from the group consisting of carbon, nitrogen, oxygen, boron, phosphorus, sulfur, chalcogens, and halogens.

3. The process of claim 1, wherein the combustible fuel is selected from the group consisting of ethanol, butanols, amyl alcohol, octanols, and other straight and branched alcohols; kerosene, mineral spirits, gasoline, naphtha, liquified petroleum gas, and other petroleum derivatives; and acetic acid, acetone, ethyl acetate, toluene, glycols, ethers, and liquid ammonia.

4. The process of claim 1, wherein the formed powder is a nanopowder.

5. The process of claim 1, wherein the formed powder has a median particle size of less than 1 μm.

6. The process of claim 1, wherein the formed powder has a median particle size of less than 100 nm.

7. The process of claim 1, wherein the formed powder has a median particle size of less than 50 nm.

8. The process of claim 1, wherein the emulsion is a polar-in-non-polar emulsion.

9. The process of claim 1, wherein the emulsion is a non-polar-in-polar emulsion.

10. The process of claim 1, wherein the emulsion is a non-polar-in-non-polar emulsion.

11. The process of claim 1, wherein the emulsion is a polar-in-polar emulsion.

12. The process of claim 1, wherein the emulsion includes dopants.

13. The process of claim 1, wherein the emulsion comprises a mixture of one or more component emulsions containing different precursor elements.

* * * * *